UNITED STATES PATENT OFFICE.

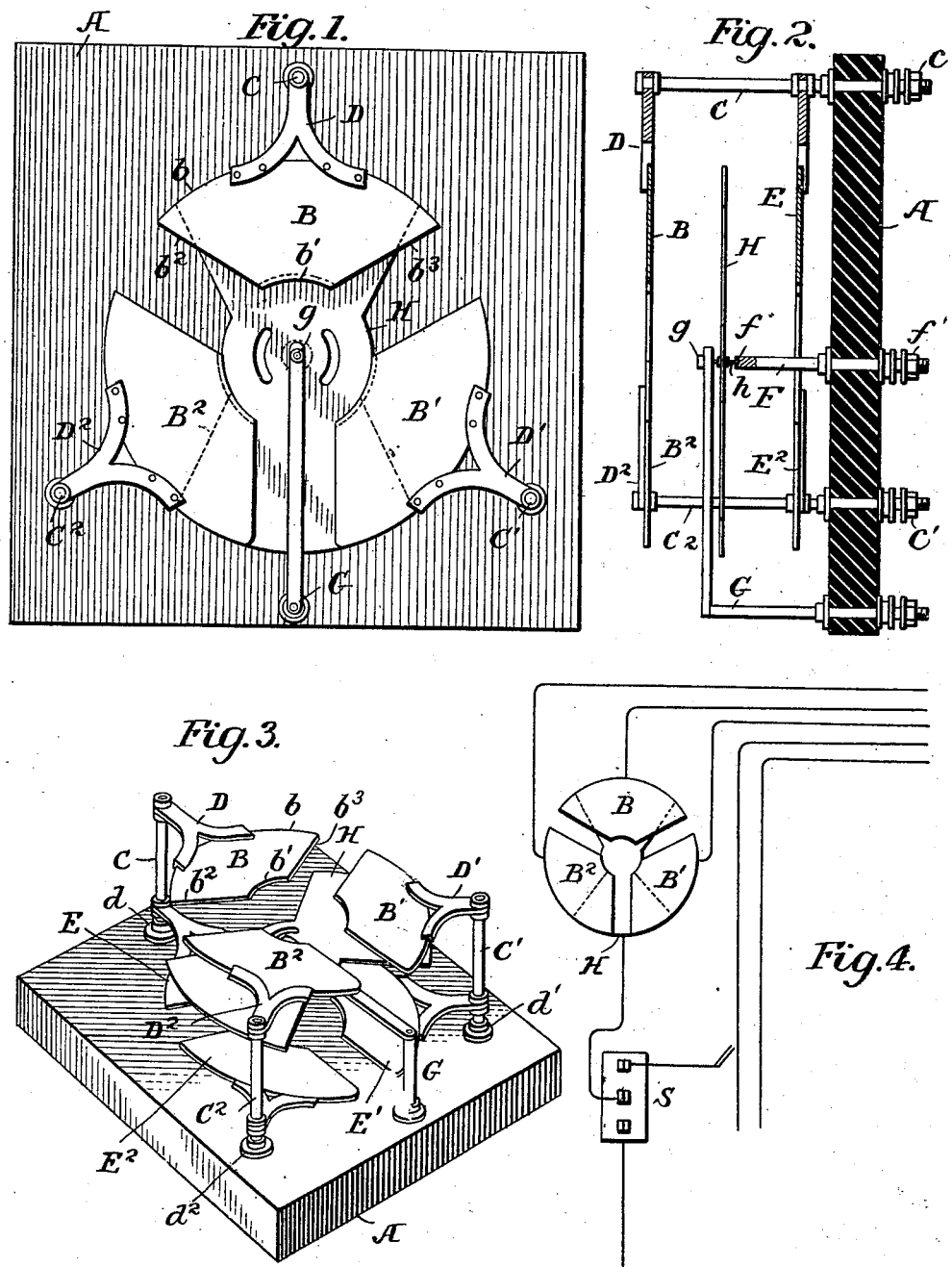

JUSTUS C. LAWLER, OF COLORADO SPRINGS, COLORADO.

GROUND-DETECTOR.

No. 880,544.  Specification of Letters Patent.  Patented March 3, 1908.

Application filed February 17, 1906. Serial No. 301,647.

*To all whom it may concern:*

Be it known that I, JUSTUS C. LAWLER, a citizen of the United States, and a resident of Colorado Springs, El Paso county, State of Colorado, have invented certain new and useful Improvements in Ground-Detectors, of which the following is a specification.

My invention relates to instruments for detecting grounds in or defective insulation of electric systems of distribution, and it has for its object to provide a simple, effective and delicate instrument, by means of which a leak may be quickly detected and indicated, and to these ends my invention consists in a three-phase static ground detector, embodying the features of construction and arrangement of parts substantially as hereinafter stated, and adapted to be used in connection with switch boards in electric plants to indicate grounds or any foreign electrical connection on any one leg of a three-phase circuit.

Referring to the accompanying drawings, wherein I have illustrated the construction of my detector,—Figure 1 is a front elevation thereof; Fig. 2 is a vertical section of Fig. 1; Fig. 3 is a perspective view of the instrument; and Fig. 4 is a diagram showing one means of using it in connection with a three-phase circuit.

I am aware that it is not broadly new to provide a ground detector for this same general purpose, but the object of my invention is to provide not only an exceedingly simple and practical construction for the instrument, but one which is very sensitive and accurate in its operation. The utility of my improved instrument is most apparent when it is used in connection with long distance transmission lines, where inspection of the lines is infrequent or in congested districts where the lengthening or shortening of lines, due to temperature or other causes, may cause some foreign contact to be made. The instrument can be made so sensitive as to indicate a ground on a circuit where any line may touch a tree, for example, or where, as in damp weather, a broken insulator may cause a leak, and the instrument is so delicate that it will indicate a ground long before any burning can take place.

The instrument may be said to consist of two general features or parts, one of which comprises the stationary plates and the other a movable vane, and these are constructed and arranged in the manner hereinafter pointed out so as to coöperate together to produce the results stated. The instrument may be adapted to work either in a horizontal or vertical position, but for convenience it is herein illustrated as in a vertical position.

The instrument comprises a base A, of any suitable character, but preferably of insulating material, and suitably supported on this base are three plates B, B', B². These plates are preferably of metal, especially for ordinary voltages, but may be of other material for extremely high voltages, and they are supported and secured in a single plane, vertical in the present instance.

I have shown supports C, C', C² in the form of standards of conducting material, adjustably secured to the base by adjusting nuts $d$ $d'$, $d^2$, etc., and the ends may conveniently be arranged to form binding posts $c$, $c'$, $c^2$ for the various wires or conductors of the three-phase circuit. The other ends of these standards are provided with arms D, D', D², which are secured to the plates B, B', B² respectively, in any suitable manner, so as to properly maintain them in the desired position and relations. These plates B, B', B², are in the general form of triangular flat plates, one side of each of which, as $b$, is in the arc of a circle and the point or apex of the plate is cut away as at $b'$, preferably on a curve concentric to the arc $b$. The sides or edges $b^2$, $b^3$, are on a right line, and the three flat plates are mounted in the same plane in a circle equi-distant from a given point and symmetrical in regard to this point, each plate occupying a space less than 120° of the circle's periphery, and are so placed with relation to each other that a straight line drawn through the center of one of the plates will pass at an equal distance from the adjacent edges of the other two plates, and the edges of the two adjacent plates are parallel to each other. If desired, in order to secure greater sensitiveness, there may be two sets of these plates, each set being precisely the same. In Figs. 2 and 3, I have illustrated a second set of plates E, E', E² mounted upon the same standards C, C', C² as the first set of plates and supported in a plane parallel with the plane of the first set and with their centers in the same relation.

One of the important features of the instrument lies in the shape of the vane, and in its arrangement with relation to the plates, and its ability to take a position in accordance with the influence exerted on it by the plates so that it will occupy either a neutral point under all three plates, or will take a position under any two of the plates so as to show that the opposite plate is grounded. Adjustably mounted in the base is a standard F having a bearing $f$ in one end, and the other end $f'$ being conveniently formed into a binding post for the earth connection. Also secured to the base is a bracket G having an upwardly extending arm provided with a bearing $g$ opposite the bearing $f$ in the standard F. Mounted in these bearings is a shaft $h$ of the vane H. This vane is preferably made of light material, such as aluminium, and is in the form of a flat plane and of a peculiar shape. It may be considered as a circle with a radius equal, or practically equal, to that on which the plates B, B' are placed, which has two equal and opposite sectors removed, the removed sectors each being equal to and of the same shape as a plate whose outer circumference is concentric with the circumference of the circle on which the vane is cut.

The vane H is mounted and secured to the shaft $h$ with the shaft piercing the geometrical center of the vane and at right angles to the plane of the vane. The vane and shaft are mounted with the vane in a plane parallel to the plates B, B', B², and at a proper distance from them, or, as shown in Figs. 2 and 3, an equal distance between the two sets of plates, and it is free to swing freely on its bearings. When the instrument is in the vertical form as shown, the vane should have one arm sufficiently counterweighted, or should be provided with some other device arranged to normally bring the vane with its arms in a perpendicular line, so that it will normally occupy the position shown in the drawings. At least one of the bearings of the shaft $h$ should be of conducting material or some other suitable device should be arranged for making an electrical connection with the vane.

As indicated in the drawing, each leg of a three-phase ungrounded circuit is connected to one of the three plates or to one of each of the sets of plates, where a plurality of sets are used, and the vane is connected to earth. This can be conveniently done by means of the standards having binding posts formed on their ends or any other well known or equivalent construction may be employed.

As is well known, opposite polarities attract and like polarities repel, so that under normal conditions the vane remains in its neutral position, which is the vertical position shown in Fig. 1, in an ordinarily arranged instrument. Now, should one leg of the three-phase circuit become grounded for any cause, one of the plates B, B', B² or one of the sets of plates where a plurality are used, will become of the same polarity as the vane and this plate, or set of plates, and the vane would repel each other. The vane being free to revolve moves away from the grounded plate or plates, and due to its peculiar shape can occupy a position under the two opposite plates or sets of plates. Thus, in Fig. 3, which is an isometric perspective, I have shown the vane H in a horizontal position, and in a position which would indicate that the plate B was grounded.

While the instrument may be connected up in any suitable manner. In Fig. 4 I have shown a convenient form, in which the common point of the switch S with more than one throw may be placed in the conductor leading from the standard F which grounds the vane. The instrument could then be made to indicate other foreign connections in the manner well understood. In some instances, it may be desirable to submerge the instrument in a clear glass of insulating oil. Again, but a single instrument is required to indicate a ground on any one leg of a three-phase circuit. The instrument can be made adjustable to a great range of voltage without change in its structure, and it may be adjusted to be highly sensitive or to have a sluggish action in connection with any particular voltage. It operates under practical conditions without the necessity of any resistances or condensers in the circuit, and as the vane moves on a simple shaft, which requires no additional means for balancing and no springs or other devices to prevent sudden stops, the vane is free to give the required indication, and if necessary, to rotate continuously. Furthermore, it will be observed that in my instrument there is but one vane, one shaft, and that the plates and vane are all flat and are arranged in parallel planes, and the plates are duplicates of one another so that they can be cheaply and accurately made and supported in proper relative positions.

What I claim is,—

1. A ground detector for three-phase electric circuits, comprising three plates in a single plane, each plate adapted to be connected to a different leg of the circuit, and a single vane common to the three plates mounted in a plane parallel to the plane of the plates and free to rotate therein.

2. A ground detector for three-phase electric circuits, comprising three plates in a single plane, equi-distant from a given point and symmetrical in regard to this point and each adapted to be connected to a single leg of a three-phase circuit, and a single vane common to the three plates mounted in a plane parallel to the plates and free to rotate therein.

3. A ground detector for three-phase electric circuits, comprising three flat plates in a single plane, equi-distant from a given point, symmetrical in regard to this point, and each occupying less than 120°, and a single vane common to the three plates mounted in a plane parallel to the plane of the plates and free to rotate therein.

4. A ground detector for three-phase electric circuits, comprising three plates in a single plane and secured in a circle equi-distant from a given point and symmetrical with the point, one side of each plate being in the arc of said circle and the adjacent sides of two plates being parallel to each other, and a single vane common to the three plates mounted in a plane parallel to the plates and free to rotate therein.

5. A ground detector for three-phase electric circuits, comprising three flat plates in a single plane, and a single flat parallel vane common to the three plates, the vane having two equal and opposite sectors and being free to rotate in its plane.

6. A ground detector for three-phase electric circuits, comprising three flat plates in a single plane and each plate adapted to be connected to a separate leg of a three-phase circuit, and a single flat vane having two equal and opposite sectors, the space between the sectors being equal to and of the same shape as a plate and the vane being free to rotate in a plane parallel to the plane of the plates.

7. A ground detector for three-phase electric circuits, comprising three flat plates in a single plane each plate adapted to be connected to a single leg of a circuit, and a single flat vane mounted on a single shaft and free to rotate in a plane parallel to the plane of the plates and adapted to assume a position under all three of the plates, or under any two of the plates according to the electrical condition of said plates.

8. A ground detector for three-phase electric circuits comprising three plates symmetrically mounted around a central point, each plate adapted to be connected to a different leg of the circuit and a single vane mounted at the central point and adapted to rotate in a plane equidistant from each of the plates.

9. A ground detector for three-phase electric circuits comprising three plates in a single plane symmetrically mounted around a central point each plate adapted to be connected to a different leg of the circuit and a single vane having two symmetrically shaped arms pivotally mounted at the central point and adapted to rotate in a plane parallel to the plane of the plates.

In testimony whereof I affix my signature in presence of two witnesses.

JUSTUS C. LAWLER.

Witnesses:
GEORGE B. TRIPP,
S. C. MOORE.